(12) United States Patent
Grgic et al.

(10) Patent No.: US 9,846,585 B2
(45) Date of Patent: Dec. 19, 2017

(54) SYSTEM AND METHOD FOR EMULATION OF AN AUTOMATION CONTROL SYSTEM

(71) Applicant: ROCKWELL AUTOMATION TECHNOLOGIES, INC., Mayfield Heights, OH (US)

(72) Inventors: Richard Grgic, Concord, OH (US); Charles Rischar, Chardon, OH (US); Kenwood Hall, Hudson, OH (US); Francisco Maturana, Lyndhurst, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 384 days.

(21) Appl. No.: 13/894,124

(22) Filed: May 14, 2013

(65) Prior Publication Data

US 2014/0343918 A1 Nov. 20, 2014

(51) Int. Cl.
*G06F 9/455* (2006.01)
*G05B 19/042* (2006.01)
*G05B 19/05* (2006.01)

(52) U.S. Cl.
CPC ........... *G06F 9/455* (2013.01); *G05B 19/042* (2013.01); *G05B 19/0423* (2013.01);
(Continued)

(58) Field of Classification Search
CPC .. G05B 17/02; G05B 19/042; G05B 19/0423; G05B 19/0426; G05B 19/056;
(Continued)

(56) References Cited

U.S. PATENT DOCUMENTS 4,965,743 A * 10/1990 Malin et al. .................... 706/45
5,980,096 A * 11/1999 Thalhammer-Reyero
(Continued)

FOREIGN PATENT DOCUMENTS

CN 102542866 A 7/2012
CN 103034128 A 4/2013
(Continued)

OTHER PUBLICATIONS

Extended European Search Report for EP Application No. 14168283.1 dated Nov. 10, 2014.
(Continued)

*Primary Examiner* — Akash Saxena
(74) *Attorney, Agent, or Firm* — Fletcher Yoder, P.C.

(57) ABSTRACT

Present embodiments include an automation control system including one or more processors and memories with an application stored on the one or more memories and implemented by the one or more processors. The application includes an interface configured to communicate with automation devices via a communication subsystem. Further, the application includes an operation environment, a programming environment, and an emulation environment. The programming environment is configured to generate device elements corresponding to the automation devices within the operation environment in which the device elements are configured to functionally interact with the automation devices. The emulation environment is configured to automatically host an emulation model of the automation devices based on the device elements generated within the operation environment.

21 Claims, 5 Drawing Sheets

(52) U.S. Cl.
CPC ....... *G05B 19/0426* (2013.01); *G05B 19/056* (2013.01); *G05B 2219/13174* (2013.01); *G05B 2219/13186* (2013.01); *G05B 2219/23258* (2013.01); *G05B 2219/23261* (2013.01); *G05B 2219/25067* (2013.01)

(58) Field of Classification Search
CPC .......... G05B 2219/13174; G05B 2219/13186; G05B 2219/23258; G05B 2219/23261; G05B 2219/25067; G06F 9/455
See application file for complete search history.

(56) References Cited

U.S. PATENT DOCUMENTS

| | | | | |
|---|---|---|---|---|
| 2003/0171905 | A1* | 9/2003 | Wagner et al. | 703/13 |
| 2007/0073421 | A1* | 3/2007 | Adra | 700/36 |
| 2007/0233286 | A1* | 10/2007 | Ishikawa et al. | 700/29 |
| 2007/0288220 | A1* | 12/2007 | Ehrmann et al. | 703/19 |
| 2008/0046227 | A1 | 2/2008 | Flamingo | |
| 2009/0089031 | A1* | 4/2009 | Sturrock et al. | 703/7 |
| 2009/0119077 | A1* | 5/2009 | Norman et al. | 703/6 |
| 2010/0174395 | A1* | 7/2010 | Gu et al. | 700/110 |
| 2010/0191515 | A1 | 7/2010 | Walenta et al. | |
| 2010/0280631 | A1* | 11/2010 | Lu et al. | 700/21 |
| 2014/0180644 | A1* | 6/2014 | Maturana et al. | 703/1 |
| 2015/0019191 | A1* | 1/2015 | Maturana et al. | 703/13 |
| 2015/0120012 | A1* | 4/2015 | Dickie | G05B 19/0426 700/86 |

FOREIGN PATENT DOCUMENTS

| | | |
|---|---|---|
| EP | 1686442 | 8/2006 |
| EP | 1686442 A1 * | 8/2006 |
| EP | 1898282 A1 | 3/2008 |
| JP | H05303408 A | 11/1993 |
| JP | H1185214 A | 3/1999 |

OTHER PUBLICATIONS

CN Office Action for CN Application No. 201410203604.6 dated Apr. 6, 2016; 7 Pages.

* cited by examiner

SYSTEM AND METHOD FOR EMULATION OF AN AUTOMATION CONTROL SYSTEM

BACKGROUND

Embodiments of the present disclosure relate to the field of automation control, and more particularly to emulation of an automation control system.

Designing, installing, operating, and maintaining automation control systems for processes can be complex and expensive operations. In order to facilitate such operations, certain aspects of a process may be simulated and associated automation controls may be utilized with the simulation to perform advanced troubleshooting and refinement of automation system designs and operational procedures. This can traditionally involve acquisition of the actual hardware for the automation control system under consideration. For example, a complex industrial process may be simulated using process simulation programs and these simulations may cooperate with actual automation controllers to assist in modeling the entire system. However, this generally results in substantial related costs.

Accordingly, automation control emulators are often used to avoid the expense and inconvenience associated with utilizing actual automation controllers. An emulator may be defined as a device, module, or software application that can accurately imitate another device. It is now recognized that traditional emulation for automation control is generally limited to requiring a user to create very limited parts of an automation control system. Further, it is now recognized that traditional emulation for an automation control system is functionally constrained and inefficient to maintain. Accordingly, it is now recognized that it is desirable to provide an improved automation control emulator system and method.

BRIEF DESCRIPTION

Present embodiments include an automation control system including one or more processors and memories with an application stored on the one or more memories and implemented by the one or more processors. The application includes an interface configured to communicate with automation devices via a communication subsystem. Further, the application includes an operation environment, a programming environment, and an emulation environment. The programming environment is configured to generate device elements corresponding to the automation devices within the operation environment in which the device elements are configured to functionally interact with the automation devices. The emulation environment is configured to automatically host an emulation model of the automation devices based on the device elements generated within the operation environment.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
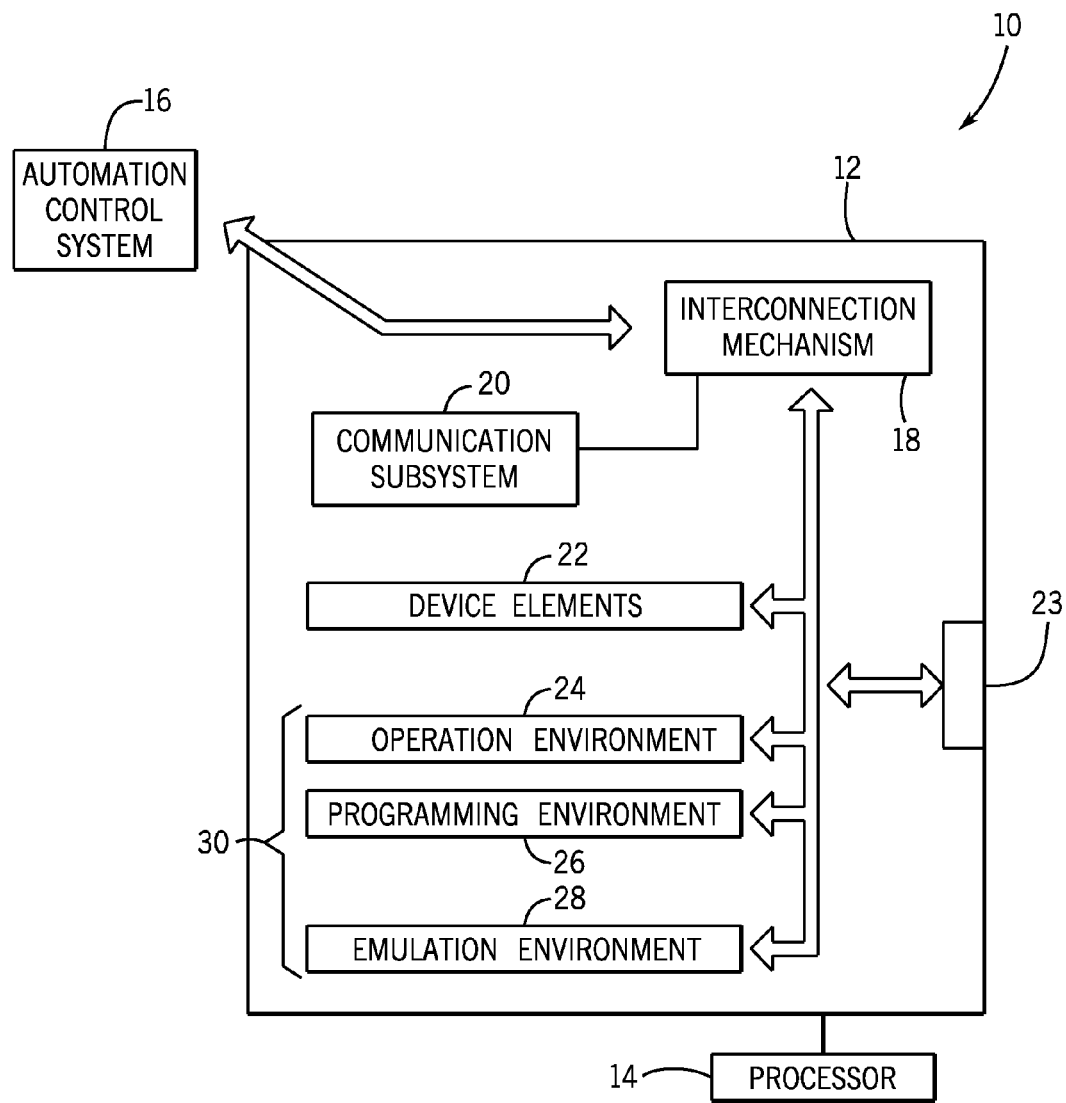
FIG. 1 is a diagrammatical representation of a control, monitoring, and emulation application or framework for a system in accordance with an embodiment of the present disclosure.

Present embodiments are directed to a system and method for emulation of one or more automation control system components. Present embodiments may function within a graphics-based environment, which may include a Windows-based environment. An emulation in accordance with present embodiments mimics operation of one or more physical devices such that an operational representation of the one or more physical devices can be utilized (e.g., within a simulation) without requiring the actual presence of the physical device or devices. For example, present embodiments are directed to enabling construction of a model that may represent numerous automation control components of an industrial process or simulation, wherein emulated automation controllers are capable of cooperating with simulators and/or other emulations to assist with analysis of an automation control system design.

Present embodiments may facilitate emulation of a wide variety of automation control devices such as automation controllers, (e.g., programmable logic controllers), input/output modules, backplanes, bridge modules (e.g., an Ethernet bridge module), motor drives, motor starters, analog modules, digital modules, and so forth. It should be noted that emulation in accordance with present embodiments may include emulation of communication (e.g., Ethernet or proprietary network communications) between the emulated modules in addition to emulation of internal operational characteristics for individual components. Further, present embodiments accommodate multiple emulation sessions. For example, if two emulation sessions are activated, emulated controllers, which may include reproduced logic, are capable of communicating and cooperating dynamically. Present embodiments include operational features that are configured to enable multiple emulation sessions to discover each other through auto-discovery such that no human interaction is required. For example, a processor may be programmed or configured to facilitate operation such that an auto-discovery process is performed and multiple emulation sessions shall discover one another.

In addition to providing emulation of a control system or control system components without requiring the physical presence of such components, present embodiments may also facilitate switching between operating with an automation control system and providing an emulation model of an automation control system. In other words, present embodiments include features that enable a transition between functioning with physically present components of an automation control system and a model that emulates an actual automation control system. Transitioning between functioning with an actual automation control system and a simulation may be achieved by a single operation (e.g., a selection button). The emulation model may directly reflect the automation control system that is actually present or the emulation may include modifications with respect to the automation control system. Construction of an operation environment that includes instances of actual automation devices for operational purposes may correspondingly generate emulation instances of the same automation devices in an emulation model within an emulation environment.

It may be desirable to include additional or fewer features in the emulation model than are present in the actual automation control system in order to investigate optimization of the system for certain operations. Beginning with an emulation model that reflects the actual existing automation control system may facilitate modification of the emulated system. It may also be desirable to directly reflect the automation control system in order to test performance under simulated conditions or for other purposes that would benefit from a replica model. Present embodiments facilitate automatic generation of emulation models that reflect an actual automation control system by generating an emulation based on attributes of modules used to construct and operationally coordinate with a physical automation control system. For example, an emulation model may be constructed based on modules within an input/output configuration tree or directory in a programming tool used to construct and control an actual automation control system. The modules of the configuration tree include descriptions for implementation with actual controllers within the physical automation control system. This information may be utilized by an application in accordance present embodiments to define an emulation model without requiring a user to separately define the emulation model. Accordingly, present embodiments allow users to avoid maintaining a separate emulation model that must be separately updated when changes are made to the actual automation control system.

FIG. 1 is a diagrammatical representation of a control, monitoring, and emulation application or framework 10 for a system in accordance with an embodiment of the present disclosure. The framework 10 may be stored on one or more computer readable media (e.g., memory) 12 that are non-transitory (i.e., not a transitory, propagating signal) and implemented by one or more processors 14 in a unified or distributed system. The framework 10 facilitates building one or more automation control environments that define or represent an automation control system 16 by utilizing an interconnection mechanism 18, which inherently supports dynamic manipulation and configuration of associated devices. This dynamic manipulation and configuration ability facilitates efficient provision of feature-rich configuration environments for configurable interfaces that can be automatically emulated in accordance with present embodiments.

The interconnection mechanism 18 may be a module-based feature that includes a protocol or protocols configured for use as one or more interfaces between modules or devices. For example, in the illustrated embodiment, the interconnection mechanism 18 includes a communication subsystem 20, which may include a library of specifications (e.g., routines) for communication with a variety of different devices and associated behavioral characteristics. Thus, the interconnection mechanism 18 enables communication between actual automation control devices in the automation control system 16 and corresponding modules within the automation control environment of the framework 10. Specifically, this may include communication between device elements 22 of the framework 10 and actual physical devices of the automation control system 16, when the physical devices are present. If a particular device element is present without a corresponding physical device being in communication, an error may be indicated but the particular device element may still be configurable. In accordance with some embodiments, the communication subsystem 20 may be described as including an application programming interface (API).

The device elements 22 may each be provided as standalone code that can be individually programmed, pre-written for use, as in a library, customized in their function and appearance in screens, and interconnected to provide information to a user as well as control and monitoring functions. The device elements 22 may include any generally similar components or self-sufficient programs that can be run as quasi-independent elements, sometimes referred to as objects. The device elements 22 generally include four features: properties, methods, connections (or connection points) and communications interfaces. Properties, in this context, may include attributes that can be adjusted, such as to define representation (e.g., an image) of the element in a screen view, as well as its location on the screen, and so forth. In this context, a method is an executable function (sometimes referred to herein as the elements "functionality" or "state engine"), and defines an operation performed by execution of the element. A connection, in this context, is a link between the device elements 22, and can be used to cause data (read from a memory or written to a memory) to be sent between device elements 22 and to system components.

Specific examples of device elements 22 may include software instantiations of devices. For example, device elements 22 may include software instances of automation devices such a programmable logic controllers, input/output devices, motor drives, pushbuttons, timers, gauges, communication servers, and applications. In general, virtually any identifiable function may be configured as one or more of the device elements 22. Moreover, as discussed below, such elements may communicate with one another to perform a wide range of display, monitoring operations and control functions. Further, in accordance with present embodiments, the device elements 22 may include an emulation function. Thus, the generation of a particular device element for an operational purpose through a design tool may result is corresponding emulation functionality. The emulation functionality may be performed by the particular device element that also coordinates with an actual automation control device, or the emulation functionality may be performed by a separate device element that is connected with the device element coordinating with the actual automation device. It should be noted that, while device elements associated with an image are quite useful, particularly for visualizations (e.g., graphic representations of automation control system features), many of the device elements 22 may not have a visual representation, but may perform functions within a system, such as a graphical user interface (e.g., a human-machine interface, distributed control system, supervisory control and data acquisition system) such as calculations, or event management and data exchange between the device elements 22.

As noted above, the framework 10 also facilitates emulation of physical automation devices (whether the automation devices are actually present or not) represented by the device elements 22 (e.g., automation control devices). The emulation may include an emulation model generated based on modules defined within the framework 10 as being representative of features of an automation control system. Specifically, the emulation model may be based on modules defining the device elements 22, which may be stored within an access system such as a file tree (e.g., a directory for an input/output configuration of the automation control system 16). It should be noted that the interconnection mechanism 18 may communicate (e.g., via the communication subsystem 20) with either the actual automation control devices represented by the device elements 22 or the corresponding emulation model in the same manner. That is, the interconnection mechanism 18 may communicate with modules of the emulation model as if communicating with actual automation control devices. Because the emulation model includes emulation modules that function like actual physical devices (e.g., controllers, input modules, output modules), the same interconnection mechanism 18 may be utilized with both. This efficiently allows a single interface to coordinate with both a physical system and an emulation instance.

The framework 10 includes interrelated software environments that can reside on a single system (e.g., computer) or multiple systems. This can be done without requiring proprietary hardware. The framework 10 may include a user interface 23 configured to cooperate with inputs (e.g., a keypad and/or touch-screen display) for accepting operator input that can be detected and managed via the interrelated software environments. Such input may be utilized for configuration, emulation, and simulation purposes. Specifically, for example, aspects of one or more of the software environments of the framework 10 may be configured or modified based on user inputs. Further, the interface 23 may be configured to receive input data from other external sources, such as hardware or software simulators. Such input data may be utilized within one or more of the interrelated software environments in accordance with present embodiments.

The interrelated software environments interact as described in detail below, to provide enhanced programming and use of the framework 10. Specifically, in the illustrated embodiment, the software environments of the framework 10 include an operation environment 24, a programming environment 26, and an emulation environment 28. These various environments 30 may be separate or interwoven environments that provide operational, design, and emulation functionalities. The environments 30 may cooperatively define a system based on user-input and/or automated electronic updating based on network detection (e.g., plug and play features). While certain aspects of the environments 30 may overlap to provide certain operational efficiencies and necessary coordination, certain aspects may be kept specifically separate. For example, an emulated automation control system or emulation model within the emulation environment 28 may be prevented from sending operational data to the corresponding physical automation control system 16. However, the operation environment 24 may be fully capable of communicating with the automation control system 16 to implement control actions and receive feedback.

The operation environment 24 enables an operator (e.g., a human user) to interact with an application, such as an active automation control system during run-time (e.g., during use of the interface, typically during interaction with or observance of a process in operation). The operation environment 24 operates using the communications subsystem 20, which may be considered a component of the operation environment 24 in some embodiments. The communications subsystem 20 is adapted to interconnect the device elements 22 and to cooperate with physical devices. In practice, the communications subsystem 20 may be thought of as including the connections of the device elements 22. However, it may include a range of software, hardware and firmware that send data to and receive data from external circuits, such as automation controllers, input/output devices, computers, networks, sensors, actuators, and so forth. Further, the communication subsystem 20 may include features that manage behavior associated with the device elements 22. For example, the communication subsystem 20 may change modes of operation, take snap shots of system feature operations, place and move the device elements 22, modify the device elements 22, group the device elements 22 (e.g., group the device elements 22 on interchangeable screens), save and restore the device elements 22, manage security, save and restore connection lists, and supply remote access to the various environments 30.

The programming environment 26 facilitates commissioning and/or configuration of an interface and associated components. For example, the programming environment 26 may include a design-time environment that facilitates graphical configuration of the features utilized in the operation environment 24 along with commissioning of hardware utilized in the automation control system 16, such as automation controllers and related component devices (e.g., input/output modules). As discussed above, this may also generate modules or device elements of a corresponding emulation model in the emulation environment 28. The programming environment 26 facilitates direct or indirect manipulation of the operation environment 24 and the emulation environment 28, without impeding or compromising the behavior of the operation environment 24. That is, design and reconfiguration of the device elements 22 can be done even while an interface is operating.

Further, in accordance with present embodiments, the communication subsystem 20 may provide access to the operation environment 24 and the emulation environment 28 via remote provision of the programming environment 26, such as in a conventional browser. The communication subsystem 20 allows a designer to interact with and change aspects of the operation environment 24 and/or the emulation environment 28 of a graphical user interface via a remote programming terminal by serving the programming environment 26 or aspects thereof to the programming terminal from the graphical user interface. For example, a graphical user interface (e.g., human-machine interface) coupled to a laptop via a network may provide a user with configuration capabilities by serving up a specific programming environment 26 to the laptop via the network.

The emulation environment 28 may provide an emulation model of an automation control system design or implementation. For example, the emulation environment 28 may provide an emulated replica of one or more of the operation environment 24 or the programming environment 26. Thus, for example, the emulation environment 28 may reflect an implemented automation control system set forth in the operation environment 24 or a proposed implementation set forth in the programming environment 26. The emulation environment 28 may be generated based on modules that correspond to physical automation devices, such as device elements that correspond to components of an input/output configuration for the automation control system 16. Further, the emulation environment 28 may facilitate creation and/or modification of the emulation model. Specifically, for example, the emulation environment 28 may be initially generated based on certain device elements corresponding to an input/output configuration of an automation control system and then modified for testing, troubleshooting, and so forth. It should be noted that the emulation model may be automatically generated (without specific user intervention) based on information already stored within the platform 10 as a result of defined aspects of the programming environment 26 and/or defined aspects of the operation environment 24. In one embodiment, a user may simply actuate a user event to transfer from the programming environment 26 or the operation environment 24 into the emulation environment 28.

Figure 2:
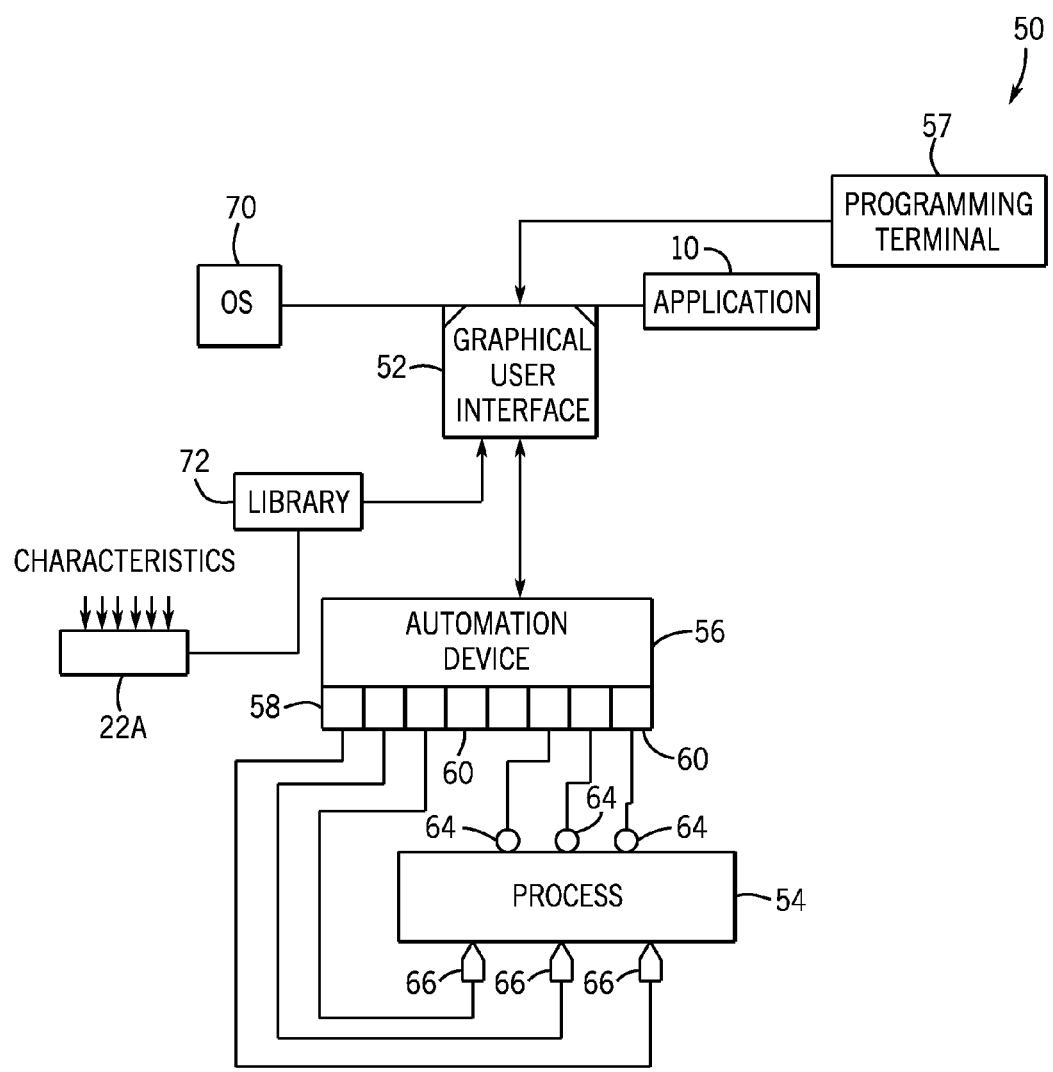
FIG. 2 is a diagrammatical representation of a control and monitoring system that is configured to implement methods described herein in accordance with an embodiment of the present disclosure.

FIG. 2 is a diagrammatical representation of a control and monitoring system 50 that is configured to implement methods described herein in accordance with an embodiment of the present disclosure. The system 50 includes a graphical user interface 52 (e.g., a human-machine interface) adapted to interface with networked components and configuration equipment. The system 50 is illustrated as including the graphical user interface (GUI) 52, which may be resident on a computer, computing resource, or the like (e.g., a cloud infrastructure), collaborating with components of a process 54 through an automation device 56 (e.g., a remote computer, automation controller) that is configured to control and/or monitor aspects of the process 28. It should be noted that the GUI 52 may be accessed and programmed via a local or remote programming terminal 57.

The GUI 52 may be adapted to allow a user to interact with virtually any process. For example, the process 54 may comprise a compressor station, an oil refinery, a batch operation for making food items, a mechanized assembly line, and so forth. Accordingly, the process 54 may comprise a variety of operational components, such as electric motors, valves, actuators, sensors, or a myriad of manufacturing, processing, material handling and other applications. Further, the process 54 may comprise control and monitoring equipment for regulating process variables through automation. In the illustrated embodiment, such equipment cooperates with the automation device 56, which includes a programmable logic controller (PLC) and an associated input/output (I/O) device 58. The I/O device 58 includes eight input/output connections 60, which may be representative physical connectors and/or associated register values. In other embodiments, the automation device 60 may include any number of similar automation devices that may be in communication with the GUI 52. The illustrated process 54 comprises sensors 64 and actuators 66. The sensors 64 may comprise any number of devices adapted to provide information regarding process conditions. The actuators 64 may similarly include any number of devices adapted to perform a mechanical action in response to an input signal received by the actuators 64.

Features of the automation device 56 and the GUI 52 may include functionality by which they read from or write to specific memory or registers of memory, typically in other devices. For example, a particular function may correspond to writing to or reading from a particular register of the automation device 56. In a simple case, for example, an object accesses a piece of data (e.g., a state of a component as determined by one of the sensors 64), and generates an output signal to write a value corresponding to the state of a different networked device. Collaboration between the GUI 52 and components of the process 54 may be facilitated by the use of any suitable network strategies. Indeed, an industry standard network may be employed, such as DeviceNet, to enable data transfer. Such networks permit the exchange of data in accordance with a predefined protocol, and may provide power for operation of networked elements.

As illustrated, the sensors 64 and actuators 66 are in communication with the automation device 56 (e.g., an automation controller) and may be assigned a particular address in the automation device 56 that is accessible by the GUI 52. This assignment may be done automatically or manually. In other embodiments, the sensors 64 and actuators 66 may be in direct communication with the GUI 52. These sensors 64 and actuators 66 may be receiving or generating data from process equipment that may be utilized by the system 50 to control and operate process equipment. Indeed, the sensors 64 and actuators 66 may be utilized within process loops that are monitored and controlled by the automation device 56 and/or the GUI 52. Such a process loop may be defined by instructions or logic (e.g., ladder logic) resident in the automation device 56 and activated based on process inputs (e.g., input from a sensor 64) or direct inputs (e.g., operator input received through the GUI 52).

The operation environment 24, programming environment 26, and emulation environment 28 may each be stored on and resident in the one or more features of the system 50. For example, each of these environments may be resident in the GUI 52 of the illustrated embodiment as components of the application 10. As an example, the communication subsystem 20 can be adapted to load the application configuration framework (e.g., framework 10) from a storage location, such as during initial manufacture or setup of the GUI 52. When loaded, the stored application or framework 10 may be adapted to create screens and locate user interface device elements (actual images or pictorial representations corresponding to the elements) in appropriate visualizations (i.e., graphical representations of system features). These applications, visualizations, and user interface elements are each types of the device elements 22. Further, device elements corresponding to automation control devices that are functioning components of the system 50 or that it would be desirable to model may be added via the GUI 52 or some other system interface.

The GUI 52 or some other feature incorporating one of the environments 30 (operation environment 24, programming environment 26, and emulation environment 28), through programming of the device elements 22, may be thought of as including instructions for presenting one or more screen views or visualizations, and device elements executed upon interaction with the GUI 52 by reference to the screen views (e.g., pressing a button, touching a location of a screen, and the like). As an example, a device element with specific characteristics may be added within a input/output directory of the GUI 52 to reflect the potential or actual inclusion of an automation controller to the system 50. Such a device element may reflect certain operational and physical features of the automation controller. For example, the added device element may reflect the presence and status of a number of inputs and outputs for the physical automation controller being represented.

A device element added as corresponding to the input/output device 58 would reflect the eight input/output connections 60. Similarly, a device element added as corresponding to the automation device 56 would include characteristics associated with the physical version of the automation device 56. Further, the added device element may link to or incorporate logic (e.g., ladder logic) stored in the automation device 56. This may include cooperating with the automation device 56 while it is online or obtaining the logic and storing it on a personal computer or the like. Obtaining this logic may include accessing the actual automation device 56 to obtain a copy of the logic stored thereon or accessing a configuration program that has not actually downloaded the logic to the physical automation device 56.

Accordingly, present embodiments may facilitate emulation of the automation device 56 being added or potentially, including the functionality provided by associated logic commands. It should be noted that the device elements may be defined by any desired software or software package. For example, the device elements 22 may be called by or executed by an operating system 70, and may be objects conforming to ".NET" or "ActiveX" standards. The operating system 70 may be based upon any suitable platform and may support technology for transmitting data over networks (e.g., the Internet).

The device elements 22 may operationally represent and/or emulate operation of a range of physical automation devices, such as automation controllers, pushbuttons, input/output modules, communication modules, and so forth. Accordingly, many pre-programmed device elements 22 may be available for use by the GUI 52. Such functional modules may be accessible via a network, or may be resident on the GUI 52, or resident on a separate device (e.g., the programming terminal 57) directly or remotely linked to the GUI 52. In this way, many possible building blocks from which visualizations and complex control and monitoring functions may be pre-programmed for control and emulation. Indeed, a library 72 of available device elements 22 may reside in the system 50 (e.g., on the GUI 62 or programming terminal 57) to facilitate configuration and/or emulation of the system 50.

In accordance with present embodiments, the GUI 52 (or another system component functioning with the platform 10) may be configured by interacting directly with a panel or screen on the GUI 52 itself (if one is present), however configuration may also be performed from the programming terminal 57. Configuration may include adding automation components via the programming environment 26 and/or the emulation environment 28. In accordance with present embodiments, adding a particular automation device as a component of the system via one environment may automatically include the added automation device in another environment. Indeed, using the same programming tool set (e.g., the programming environment 26) used to construct and control a physical automation control system instantiation for the operation environment 24, an emulation of the physical automation control system may be instantiated in the emulation environment 28. As a more specific example, present embodiments include a programming tool set within the programming environment 26 that is configured to construct a physical system instantiation, which may be defined as a software realization of an abstraction of the actual automation control system features, and a corresponding emulation based on the same programming operations. This is beneficial because it may be desirable for an emulation model to directly reflect an automation control system. In other words, it may be desirable for the emulation model to include emulation devices that reflect essentially all of the physical devices in the automation control system. Indeed, even if the intent is to modify the emulation model (e.g., for optimization purposes), it may be desirable to begin with a direct reflection of the automation control system.

Figure 3:
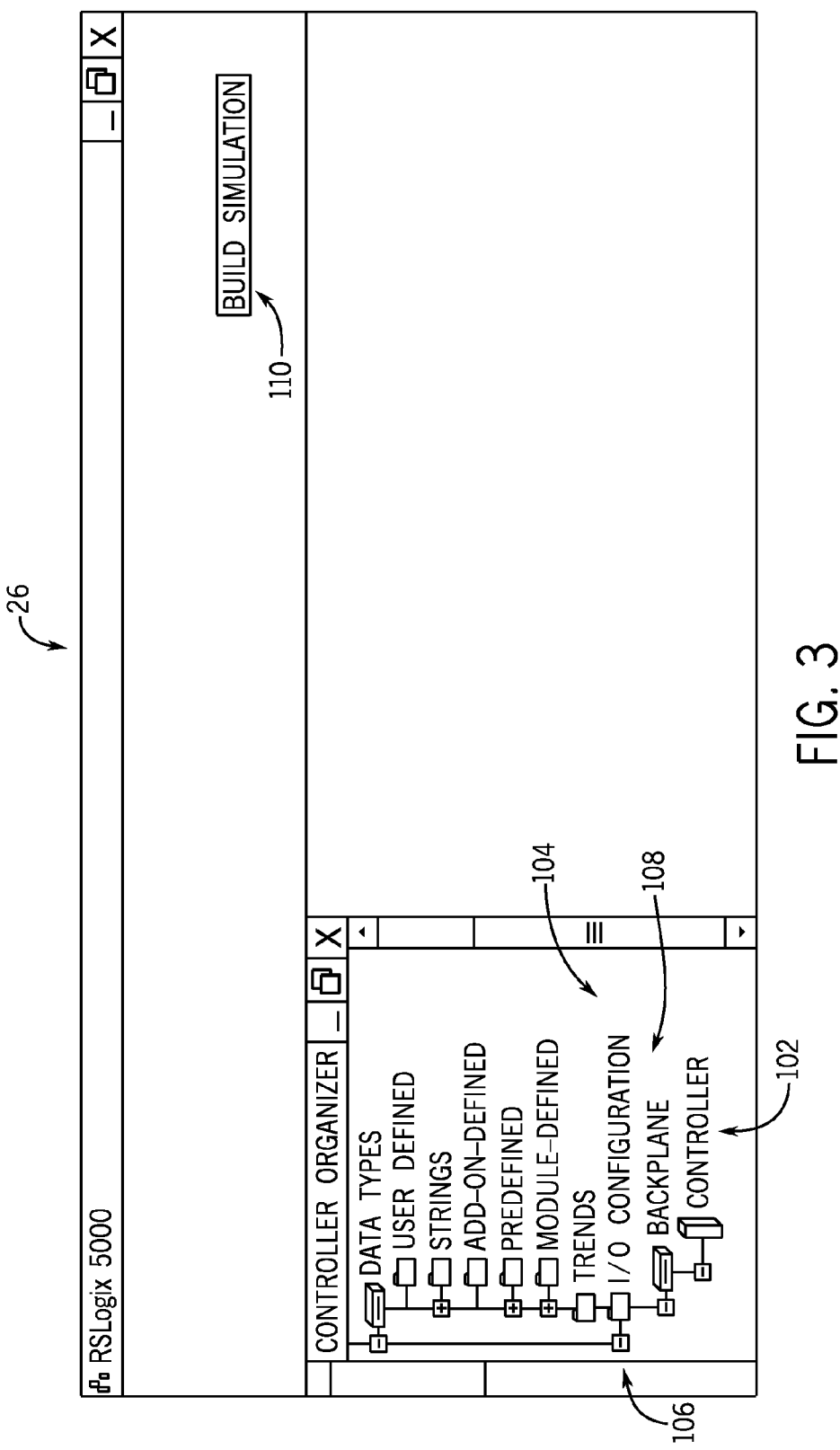
FIG. 3 illustrates a graphical screen view of one embodiment of a programming environment in accordance with the present disclosure.

FIG. 3 represents one example of the programming environment 26 in accordance with present embodiments. Further, FIG. 3 provides the basis for a specific example of adding a device element for operational purposes and correspondingly adding an emulation feature. Specifically, the programming environment 26 of FIG. 3 may be accessed via the GUI 52 to add a device element 102 that corresponds to the automation device 56. This may be achieved by adding the device element 102 into the I/O configuration folder 104 within a controller directory 106 by dragging and dropping from a library. Specifically, the device element 102 may correspond to a specific type of controller and may be added in a backplane folder 108 in a similar fashion to adding a corresponding physical controller to a physical backplane. If a corresponding backplane and controller are actually present, the device element 102 may function to communicate with the actual represented controller. However, even if the physical devices are not present or not communicating, representative instances that do not fully operate within the operation environment 24 may be dynamically added and emulated without user intervention.

Adding the device element 102, which includes characteristics associated with a specific physical controller for presentation in the operation environment 24 also results in adding corresponding emulation capabilities, which may be based on components of the added device element or a linked device element. For example, adding the device element 102 may automatically generate corresponding emulation functionality in the emulation environment 28 by creating a device element within an emulation model. Thus, when an instantiation of an automation control system is completed for use in the operation environment 24, an emulation model is correspondingly prepared for emulation in the emulation environment 28. The emulation model may be accessed by triggering the emulation environment 28 from the programming environment 26 by pressing an emulation trigger 110. Thus, a user of the programming environment 26 will have the ability to switch between the programming environment 26 and the emulation environment 28. When the emulation model is being accessed, the emulation environment may include a visual indicator to visually indicate that the emulation environment is being accessed.

The emulation model may reflect certain physical aspects, functional aspects, and programming of the automation device 56. The emulation model is essentially constructed without user intervention using emulation libraries based on physical attributes of modules used to construct the physical system (i.e., the functional representation of the operation environment 24). Once the emulation model is constructed, a programming tool set of the programming environment 26 will be capable of interacting with the emulation model in essentially the same manner it would operate with the physical system instantiation (e.g., via the communication subsystem 20). As discussed above, the emulation model may be modified relative to the physical system for testing purpose, optimization, and the like. Further, in some embodiments, an emulation model may be created with the platform 10 completely separately from an actual automation control system implementation.

Construction of the physical automation control system instantiation and/or emulation model may involve obtaining functional modules or device elements 22 from a library. Indeed, a large number of predefined modules or device elements 22 may be available that correspond to known automation devices. However, some automation devices may not include a predefined module or device element. While it should be noted that additional device elements may be added to the library 72, present embodiments include user-definable base structures (device elements) for representation and emulation of automation devices that are not defined. In fact, in some embodiments, all or a species of predefined automation devices may be based on the same base device element that is instantiated with different names and potentially different characteristics. Multiple uniquely functioning and uniquely identified modules may be instantiated based on the same base module or device element. While such predefined features may be automatically incorporated with the base device element, users may also define their own features. For example, if a device element corresponding to a particular brand of input/output device is not resident on the GUI 52, a user can download such an element from a remote source or define the appropriate aspects or characteristics of the input/output device. Device element 22A in FIG. 2 represents a base element that has characteristics capable of default definition based on a library type or user definition.

Figure 4:
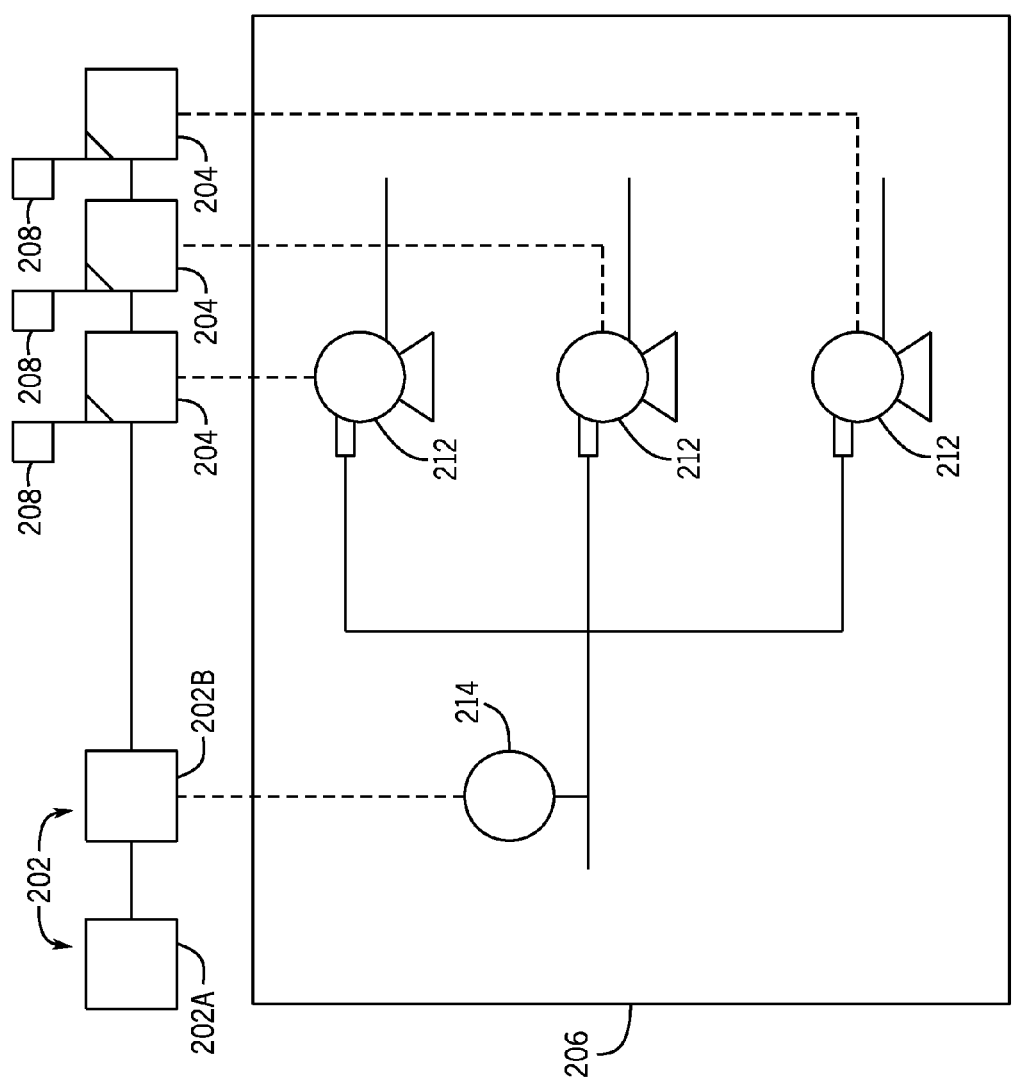
FIG. 4 is a schematic representation of cooperation of emulation components and simulation components with respect to a system visualization in accordance with present embodiments.

FIG. 4 schematically illustrates cooperation of emulation components 202 and simulation components 204 in accordance with present embodiments. The emulation components 202 and simulation components 204 may also interact with actual physical devices (e.g., an actual hardware controller) in accordance with present embodiments. Specifically, in FIG. 4, the emulation components 202 and simulation components 204 are schematically illustrated relative to a visualization 206 of an industrial process. The emulation components or device elements 202, which may be accessible via the library 72 or related libraries, may be configured to interact with external or internal software referred to as the simulation components 204, which are configured to generate inputs and consume outputs. The simulation components 204 may include simulation engines 208 that simulate operation of a physical process. For example, simulation engines 208 may include mathematical models that simulate distillation within a column, pressure changes through valves, momentum in mechanical operations, pressure or temperature changes through equipment, and so forth. Accordingly, the simulation components 204 may receive inputs from the emulation components 202 corresponding to operational commands (e.g., close valve or activate pump) and then perform a simulation of the actual physical results. The simulated result may then be provided to the emulation components 202 for further processing. It should be noted that intentional delays or pulses of emulation results may be employed to allow time for the simulation models to provide output. Present embodiments facilitate managing virtual clock time by expanding time steps, contracting time steps, or rewinding time steps. This includes accelerating, decelerating, or rewinding virtual time in an emulation and/or simulation.

As a specific example, the emulation components 202 may represent features of a control system designed to control a pumping system represented by graphical pumps 212 and operationally simulated by the simulation components 204. During an emulation session, the emulation components 202 may generate a command to activate numerous pumps based on emulated control logic. For example, emulation component 202A may represent a controller that provides instructions to the pumping system based on data from a pressure sensor represented by graphical sensor 214 and emulated by emulation component 202B. The simulation components 202 may simulate the physical aspects of the pumps. Thus, the simulation components 204 may receive an input from the emulation components 202 indicating that the numerous pumps should be activated and then calculate a simulated pressure generated by such an activation. The value of this simulated pressure may then be provided to the emulation components 202 for further emulation, which may include shutting down one or more pumps based on a high pressure in accordance with the emulated logic. It should be noted that the emulation components 202 may interact with the simulation components 204 in the same way that the emulated devices would interact with an actual process. Further, it should be noted that the same visualization 206 or components of the same visualization 206 may be utilized in the operation environment 24 and the emulation environment 28. Certain graphical distinctions (e.g., coloring or textual indications) may alert a user to the nature of the environment despite overlapping use of the visualization 206.

Figure 5:
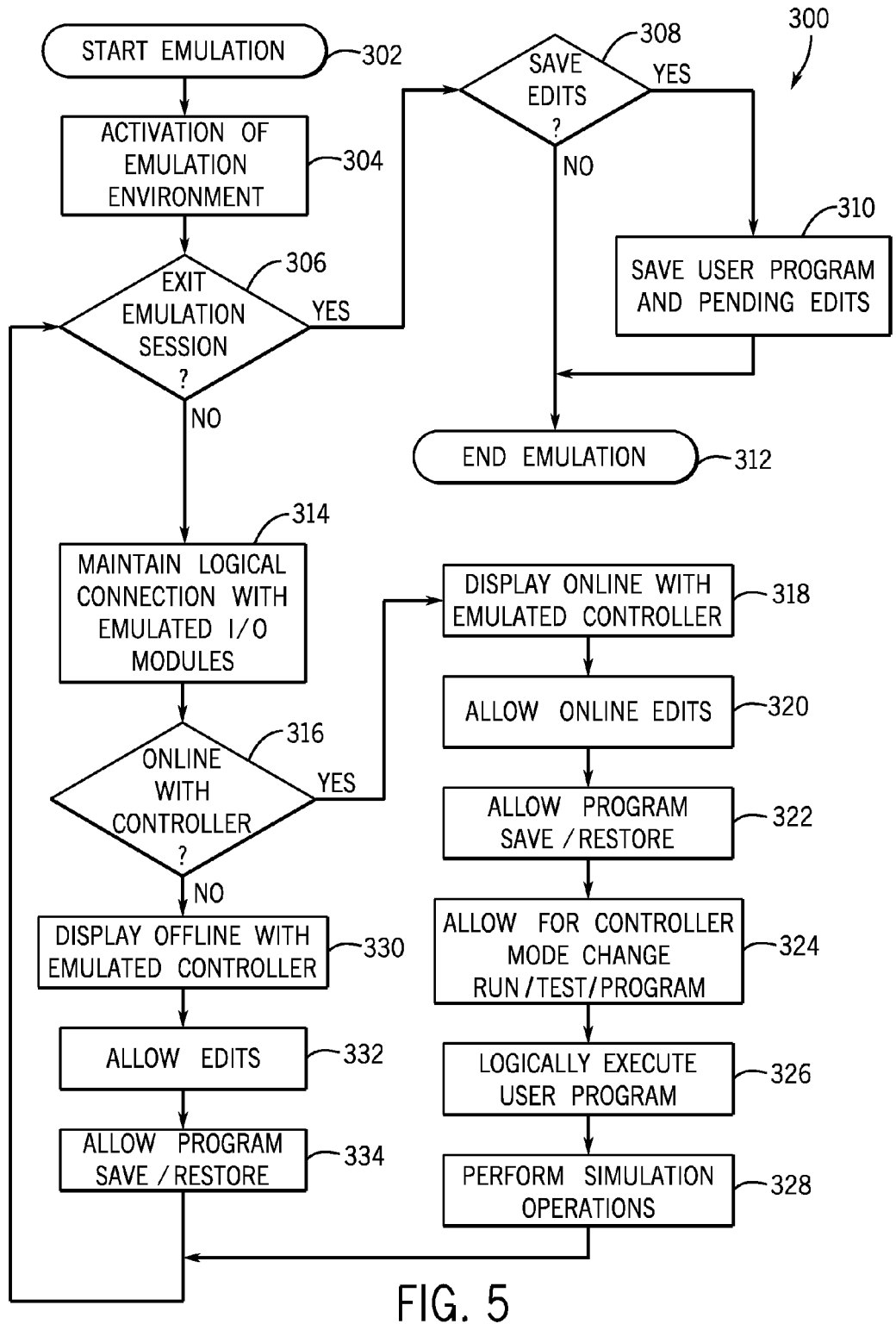
FIG. 5 is a process flow diagram of a process for performing an emulation session in accordance with present embodiments.

FIG. 5 is a process flow diagram of a process 300 for performing an emulation session in accordance with present embodiments. The process 300 may be initiated 302 from outside of an emulation environment by a single event, such as activation of a button in a programming environment. This results in activation 304 of the emulation environment, which may include active emulation of components of a previously defined control environment (operational environment). Operation within the emulation environment may be visually distinguishable from other environments (e.g., an operational environment). The process 300 includes periodically determining 306 whether an exit command has been submitted. For example, if a user issues an exit command from within the emulation environment, the user may be prompted 308 to indicate whether previously made edits should be saved. If the user responds in the affirmative, the user program and pending edits are saved 310. If the user responds in the negative, the emulation environment is exited 312.

If a user continues and does not exit the emulation environment, an emulation may be executed, which may include various process components. Specifically, for example, logical connection with emulated modules may be maintained 314 and a determination may be made 316 regarding whether the emulation is online with one or more controllers. If the one or more controllers are online, an indication is provided 318 that the emulation is online with the emulated controller. Further, on line edits may be allowed 320, program save/restore may be allowed 322, controller mode change may be allowed 324, a user program may be logically executed 326, and simulation operations may be performed 328. If the one or more controllers are offline, an indication is provided 330 that the emulation is offline with the emulated controller, edits are allowed 332, and a program save/restore is allowed 334.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An automation control system, comprising:
  one or more processors and memories;
  an application stored on the one or more memories and implemented by the one or more processors, the application including an interface configured to communicate with one or more automation devices via a communication subsystem;
  a programming environment of the application configured to generate one or more device elements corresponding to the automation devices based on a request to add the one or more device elements, wherein the one or more device elements are configured to provide information regarding an operation of the one or more automation devices to a user via an operation environment, wherein the one or more device elements are communicatively coupled to the one or more automation devices;

the operation environment of the application, wherein the operation environment is configured to depict the device elements on a graphical user interface, wherein the device elements are configured to enable an operator to implement a change to one or more operations of the automation devices during run-time; and an emulation environment configured to:
cause the one or more device elements to retrieve a copy of logic from the one or more automation devices via the communication subsystem upon addition of the device elements via the programming environment; and
emulate one or more operations of the one or more automation devices based on the logic via an emulation model.

2. The automation control system of claim 1, wherein the emulation environment is configured to automatically host the emulation model of the automation devices based on the device elements generated within the operation environment and interfaces to one or more other devices.

3. The automation control system of claim 1, wherein the emulation model comprises one or more emulation modules with a first set of characteristics defined by a second set of characteristics of the device elements.

4. The automation control system of claim 3, wherein each of the emulation modules is configured to receive input and provide output in a manner that emulates a physical automation device and wherein each of the emulation modules is configured to receive input from a simulation model.

5. The automation control system of claim 4, wherein the physical automation device being emulated includes an input/output device, an automation controller, or a motor drive.

6. The automation control system of claim 1, wherein the emulation model is configured to emulate communications between the automation devices.

7. The automation control system of claim 1, wherein the programming environment is configured to instantiate one of the device elements within the programming environment upon detection of communicative coupling of a physical automation device to the automation control system.

8. The automation control system of claim 1, wherein the emulation environment is configured to facilitate user modification of the emulation model.

9. The automation control system of claim 1, wherein the emulation environment graphically presents in a manner that differs from that in which the operation environment graphically presents.

10. The automation control system of claim 1, wherein the interface is configured to communicate with the emulation model via the communication subsystem.

11. The automation control system of claim 1, comprising an emulation trigger within the programming environment, wherein actuation of the emulation trigger causes activation of the emulation environment.

12. A method, comprising:
configuring an operation environment by instantiating a device element within a programming environment in response to a first input received from an operator via a graphical user interface, wherein the device element is configured to control one or more operational characteristics of a physical automation device and provide information regarding operation of the physical automation device to a user via the operation environment, wherein the device element is communicatively coupled to the physical automation device;

retrieving, via the instantiated device element, a copy of logic from the physical automation device via a communication subsystem configured to allow communication between the graphical user interface and the physical automation device upon instantiation of the instantiated device element;
emulating, via an emulation environment, the one or more operations of the physical automation system based on the logic;
receiving a second input from the operator via the instantiated device element in the operation environment, wherein the second input is configured to change the instantiated device element to adjust the one or more operational characteristics of the physical automation device; and
upon implementation of the change to the instantiated device element via the operation environment, automatically generating an emulation module of an emulation model within the emulation environment of the instantiated device element with respect to the change, wherein the emulation module is configured to emulate the physical automation device based on the one or more adjusted operational characteristics of the device element.

13. The method of claim 12, comprising activating the emulation environment based on an input received via an emulation trigger depicted in the programming environment.

14. The method of claim 12, comprising utilizing at least one memory and at least one processor to perform instantiations of one or more device elements and one or more modules, and performing simulations.

15. The method of claim 12, comprising providing a directory tree including one or more instantiated device elements that are configured for emulation.

16. The method of claim 12, wherein the first and second inputs are generated by a user-input device.

17. The method of claim 12, comprising managing virtual clock time by expanding time steps, contracting time steps, or rewinding time steps.

18. One or more tangible, non-transitory machine-readable media comprising instructions configured to be carried out on an electronic device configured to coordinate with an automation control system, the instructions configured to:
populate an operation environment by instantiating a device element within a programming environment in response to a first input by an operator via a graphical user interface, wherein the device element is configured to control one or more operational characteristics of a physical automation device of the automation control system and provide information regarding the one or more operational characteristics of the physical automation device;
populate an emulation model within an emulation environment with an emulation module of the instantiated device element, wherein the emulation environment is configured to cause the one or more device elements to retrieve a copy of logic from the one or more automation devices via the communication subsystem upon instantiation of the instantiated device element and emulate the one or more operational characteristics of the physical automation device based on the logic; and
upon receiving a second input from the operator, wherein the second input is configured to implement a change to the instantiated device element via the operation environment, automatically populate an emulation model within the emulation environment with an emulation module of the instantiated device element with respect to the change, wherein the emulation module is configured to emulate the physical automation device based on the operational characteristics of the device element and the change.

19. The one or more tangible, non-transitory machine-readable media of claim 18, comprising instructions configured to automatically populate the emulation model with the emulation module when the emulation environment is activated.

20. The one or more tangible, non-transitory machine-readable media of claim 18, comprising instructions configured to provide output to or receive input from a simulation component.

21. The one or more tangible, non-transitory machine-readable media of claim 18, configured to provide remote access to the programming environment.

* * * * *